United States Patent [19]

Bhateja

[11] Patent Number: 4,808,352

[45] Date of Patent: Feb. 28, 1989

[54] CRYSTALLINE VINYLIDENE FLUORIDE

[75] Inventor: Sudershan K. Bhateja, Cottage Grove, Minn.

[73] Assignee: Minnesota Mining and Manufacturing Company, St. Paul, Minn.

[21] Appl. No.: 783,410

[22] Filed: Oct. 3, 1985

[51] Int. Cl.$^4$ .............................................. B29C 71/04
[52] U.S. Cl. ........................................ 264/22; 264/27; 264/235; 264/288.4; 264/346; 526/255
[58] Field of Search .................. 264/22, 24, 27, 288.4, 264/288.8, 235, 346; 526/255

[56] References Cited

U.S. PATENT DOCUMENTS

| | | | |
|---|---|---|---|
| 3,644,605 | 2/1972 | Sessler et al. | 264/22 |
| 3,691,264 | 9/1972 | Asahina | 264/216 |
| 3,707,592 | 12/1972 | Ishii et al. | 264/235.6 |
| 3,878,274 | 4/1975 | Murayama et al. | 264/22 |
| 4,241,128 | 12/1980 | Wang | 264/22 |
| 4,390,674 | 6/1983 | Ward et al. | 264/22 |
| 4,393,093 | 7/1983 | Sprout, Jr. | 264/22 |
| 4,481,158 | 11/1984 | Georlette et al. | 264/22 |
| 4,508,668 | 4/1985 | Broussoux et al. | 264/24 |
| 4,521,322 | 6/1985 | Broussoux et al. | 264/22 |

FOREIGN PATENT DOCUMENTS

| | | |
|---|---|---|
| 0000449 | 1/1979 | European Pat. Off. |
| 0056181 | 7/1982 | European Pat. Off. ............ 264/22 |
| 48-13712 | 4/1973 | Japan ................................. 264/22 |
| 50-101450 | 8/1975 | Japan ................................. 264/22 |
| 57-23286 | 2/1982 | Japan ................................. 264/22 |

OTHER PUBLICATIONS

*Ferroelectrics*, 1984, vol. 57, pp. 3-4.
*J. Appl. Poly. Sci.* 6(22), 456 (1962).
*Am. Chem. Soc. Poly. Prepr.*, 6, 987 (1965).
*JMS-Rev. Macromol. Chem. Phys.*, C25(2), 227-275 @ 261-265 (1985).
"Annealing Effects in Poly(Vinylidene Fluoride) as Revealed by Specific Volume Measurements, Differential Scanning Calorimetry, and Electron Microscopy", *J. Polym. Sci. Polym. Phys. Ed.*, vol. 11, pp. 2153-2171.
M. G. Broadhurst, G. T. Davis, J. E. McKinney and R. E. Collins, J. Appl. Phys., 49, 4992 (1978).

*Primary Examiner*—Jeffery Thurlow
*Attorney, Agent, or Firm*—Donald M. Sell; James V. Lilly

[57] ABSTRACT

Highly crystalline polymers containing recurring vinylidene fluoride units are disclosed. Such polymers, including homopoly(vinylidene fluoride), have a degree of crystallinity greater than 70%. Also disclosed is a method for enhancing the crystallinity of polymers containing recurring vinylidene fluoride units.

17 Claims, 5 Drawing Sheets

CRYSTALLINE VINYLIDENE FLUORIDE

FIELD OF THE INVENTION

This invention relates to methods for treating poly(vinylidene fluoride), hereinafter sometimes referred to as PVDF. More particularly it relates to methods for increasing the crystallinity of PVDF.

Background Art

PVDF has found many uses due to its environmental stability, mechanical and impact strength, abrasion resistance and chemical and solvent resistance. It has also been found that if PVDF is subjected to a large potential gradient at an elevated temperature (i.e., if it is poled), it possesses a piezoelectric and pyroelectric activity which makes it useful in numerous applications including, for example, as transducers, heat (e.g., infrared) detectors, loudspeakers, strain gauges, keyboards, etc.

It has been established that the magnitude of the piezoelectric and pyroelectric activity of PVDF is related to both its degree of crystallinity (see M. G. Broadhurst, G. T. Davis, J. E. McKinney and R. E. Collins, J. Appl. Phys., 49, 4992 (1978)) and its crystal habit. Thus, it is only the crystal form of poled PVDF that exhibits piezo- and pyroelectric behavior.

Generally speaking, the crystallinity of PVDF is limited to about 50%. See "Proceedings of the U.S. - Japan Seminar on Piezoelectric Polymers", Ferroelectrics, 1984, Vol. 57, pp. 3-4, Gordon and Breach, Science Publishers, Inc. This in turn limits the piezo- and pyroelectric constants of PVDF and therefore the magnitude of its piezo- and pyroelectric activity. It has been reported that the degree of crystallinity of PVDF can be increased to 65% by annealing at elevated temperatures (e.g., 130° C.–180° C.) for extended periods, (e.g., 1 to 11 days). See "Annealing Effects in Poly(vinylidene fluoride) as Revealed by Specific Volume Measurements, Differential Scanning Calorimetry, and Electron Microscopy", J. Polym. Sci. Polym. Phys. Ed., Vol. 11, pp. 2153-2171. However, such annealing conditions are cumbersome to employ and degrade the PVDF.

DISCLOSURE OF THE INVENTION

It has been found that the degree of crystallinity of PVDF can be substantially increased by exposing the polymer to high energy ionizing radiation (such as can be conveniently provided by high energy electron beam radiation) preferably followed by aging at, for example, room temperature and pressure. The PVDF can then be stretched or oriented to change the crystal structure from the α to the β form followed by poling to increase its piezoelectric and pyroelectric activity.

As it is used in this specification, PVDF includes homopolymers of 1,1-difluoroethylene (also known as vinylidene difluoride) and to polymer blends of such homopolymers with compatible polymers such as polymethylmethacrylate.

The present invention provides (a) techniques for increasing the degree of crystallinity of PVDF, and (b) highly crystalline PVDF articles, such as films.

In accordance with the present invention the crystallinity of PVDF is increased by exposing essentially unoriented PVDF to high energy ionizing radiation at a temperature and radiation dose sufficient to initiate the process of increasing crystallinity. Once initiated, the crystallinity of the PVDF will continue to increase at room temperature and pressure without further irradiation.

The use of radiation to increase the crystallinity of linear polyethylene has been discussed in J. Poly. Sci. Poly. Phy. Ed, Vol. 21, 523–536 (1983) and J. Macromol. Sci.-Phys., B22(1), 159-168 (1983). The use of radiation to increase the crystallinity of polytetrafluoroethylene has been discussed in J. Polymer Sci., Polymer Chem. Edn., 19, 2465 (1981). However, it has also been taught that PVDF crosslinks when exposed to high energy ionizing radiation. See J. Appl. Poly. Sci., 6(22), 456 (1962) and Am. Chem. Soc. Polym. Prepr., 6, 987 (1965). Surprisingly, however, it has been found that in the process of the invention PVDF causes a substantial increase in crystallinity of the irradiated polymer as a result of the conversion of its amorphous regions to crystalline regions. This clearly implies that the amorphous regions have not undergone extensive crosslinking as a result of their irradiation.

The increase in crystallinity achieved by the present invention can be verified by measuring the heat of fusion of the PVDF before and after exposure to the ionizing radiation. Heat of fusion may be measured with a differential scanning calorimeter (DSC) following the procedures described in ASTM D 3417.

BRIEF DESCRIPTION OF THE DRAWINGS

The present invention is further described with reference to the accompanying drawings wherein.

DETAILED DESCRIPTION

Figure 1:
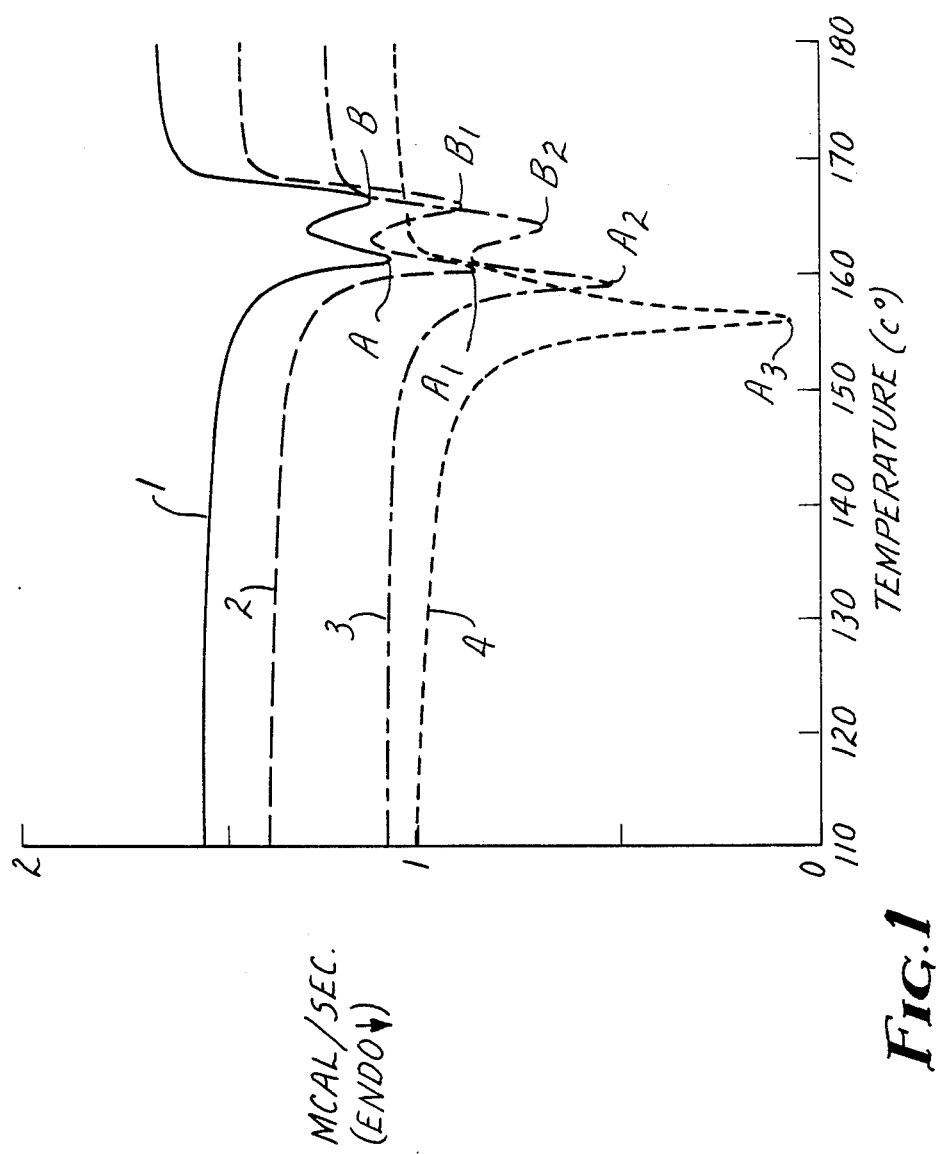
FIG. 1 is a DSC scan showing the response of PVDF when subjected to various doses of high energy ionizing radiation.

In the present invention essentially unoriented PVDF (the precursor) is exposed to high energy ionizing radiation at a temperature and a dose sufficient to start the increase of crystallinity. While neither the precise temperature nor dose utilized is critical to the invention, it is important that exposure be carried out between the glass transition temperature ($T_g$) and the melting temperature ($T_m$) of the precursor. Typically, ambient or room temperature (e.g., about 20° C.) is a convenient exposure temperature. Preferably the precursor is in film form.

A variety of radiation sources may be employed in the invention. Electron beam radiation sources are one example of a useful radiation source. While the radiation dose utilized is not critical to the invention, it must be sufficient to initiate the increase in degree of crystallinity in the irradiated sample but not so large as to cause significant crosslinking of the amorphous regions of the PVDF. An example of a useful range of radiation doses is from 0.5 to 50 megarads (Mrad). Lower doses may be employed if desired. However, the rate of increase tends to be very slow at such doses so that they are not entirely practical to employ. Higher doses may also be employed if desired provided that they do not cause significant crosslinking. A preferred range is from 0.5 to 20 Mrad.

The mechanism by which the enhanced crystallinity is achieved in the present invention is not fully understood. However, it is theorized that irradiation causes scission of at least some of the molecular chains in the intercrystalline or amorphous regions leaving dangling chains which are then able to recrystallize.

Subsequent to irradiation, the polymer may be oriented, either uniaxially or biaxially, so as to convert the $\alpha$ phase to the $\beta$ phase. Techniques for bringing about such orientation and phase conversion are known to those in the art. Typically orientation is carried out at a temperature between $T_g$ and $T_m$ by stretching the film to at least three times (preferably four times) its original length (or width). Orientation may be carried out either uniaxially or biaxially. It has been found that orientation can bring about almost total conversion (i.e., 98% or more) of the $\alpha$ to the $\beta$ crystal form. This conversion may be verified by the use of X-ray diffraction scans or infrared measurements.

Polymers treated as described in this invention have an enhanced degree of crystallinity. While the specific increase achieved is a function of the PVDF treated and the conditions employed, it has been possible to achieve a degree of crystallinity of 70% or more based upon a heat of fusion for single crystal PVDF homopolymer of 25 cal/g. See Nakagawa and Ishida, J. Polym. Sci.-Phys., Vol. 11, 2153 (1973), and Welch and Miller, J. Polym. Sci.-Phys., Vol. 14, 1683 (1976).

The end groups of PVDF are believed to be inconsequential in the practice of the invention. The exact concentration and nature of the end groups is largely fixed by the selection of the free radical initiators used in the preparation of the PVDF and the presence or absence of chain transfer agents in that preparation. The resultant polymers typically have a weight average molecular weight of at least 700,000.

Commercially available PVDF may be utilized in the present invention. For example, an unoriented "Kynar" film from Pennwalt Corporation may be irradiated to provide polymers of the invention.

The present invention is further described by the following representative examples.

EXAMPLE 1

Unoriented poly(vinylidene fluoride) ("Kynar" film, 25 μm thick, specific gravity 1.76, $\alpha$ form, from Pennwalt Corporation) was cut into separate sections. The sections were individually exposed to high energy ionizing radiation in a Van de Graaff accelerator using a 175 KeV electron beam. Radiation doses of 0, 5, 20 and 50 Mrad were employed.

DSC scans were made within 8 hours of irradiation using a Perkin-Elmer DSC-4 at the rate of 10° C./min. to measure the increase in the heat of fusion of the samples (3 mg samples). The heat of fusion is an index of the % crystallinity of the films. X-ray diffractometer scans were made using a Philips XRG 3100 generator with CuK$_\alpha$ radiation at 25 Kv and 10 mA and a Norelco diffractometer to determine the crystal phase of the film before and after irradiation.

FIG. 1 represents the DSC scan. Curves 1, 2, 3 and 4 respectively represent the scan obtained from unirradiated, 5 Mrad irradiated, 20 Mrad irradiated, and 50 Mrad irradiated PVDF film. The unirradiated sample (Curve 1) shows two endothermic peaks located at 161.5° C. (Point A) and 166.5° C. (Point B) respectively. The height of the higher temperature peak diminishes with increasing radiation dose. See points $B_1$ and $B_2$. The peak finally disappears at a dose of 50 Mrad (see Curve 4). The height of the lower temperature peak increases with increasing dosage. Compare points $A_1$, $A_2$ and $A_3$ with Point A.

Figure 2:
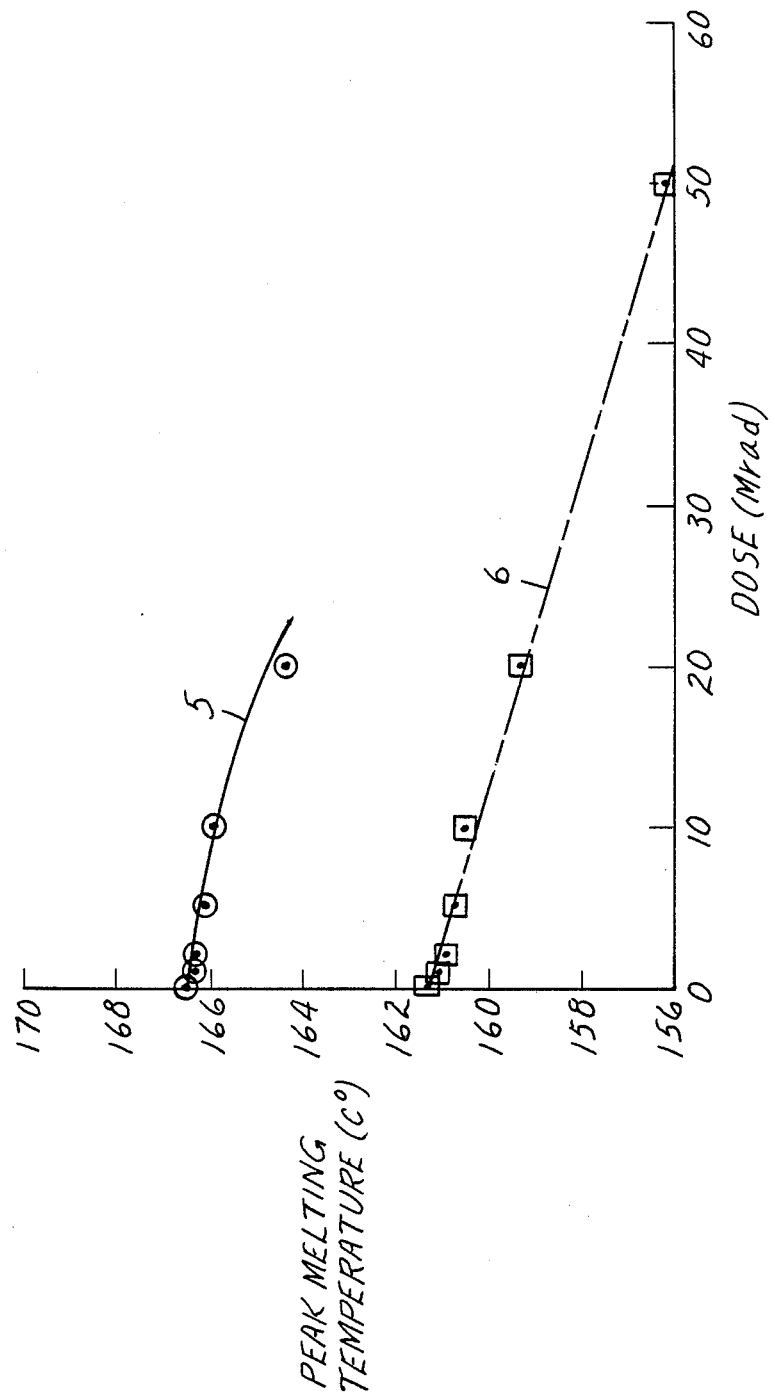
FIG. 2 shows the change in melting temperature of PVDF which has been exposed to various doses of high energy ionizing radiation.

FIG. 2 shows the variation of peak melting temperature with irradiation dose. Curve 5 represents the change in the higher temperature peak with dose. Curve 6 represents the change in the lower temperature peak with dose. As can be seen, the peak melting temperature is lowered as the radiation dose is increased.

Figure 3:
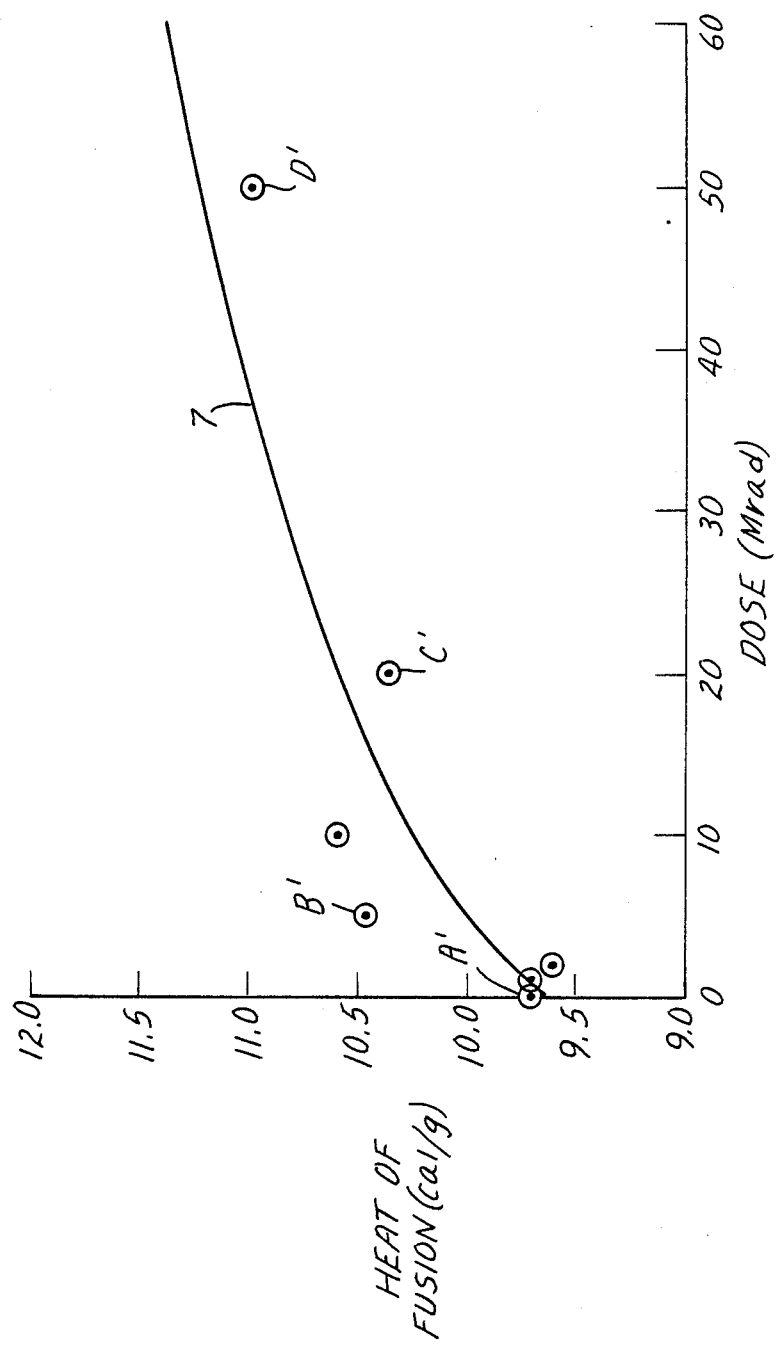
FIG. 3 shows the effect of high energy radiation upon the heat of fusion of PVDF.

FIG. 3 shows the change in the heat of fusion resulting from irradiation. As can be seen from Curve 7, the unirradiated sample has a heat of fusion of 9.7 cal/g (Point $A_1$). The 5 Mrad sample has a heat of fusion of 10.5 cal/g (Point $B_1$). This represents an 8.2% increase over unirradiated PVDF. The 20 Mrad sample has a heat of fusion of 10.4 cal/g (Point $C_1$). This represents a 7.2% increase over unirradiated PVDF. The 50 Mrad sample has a heat of fusion of 11 cal/g (Point $D_1$). This represents a 13.4% increase over unirradiated PVDF.

Figure 4:
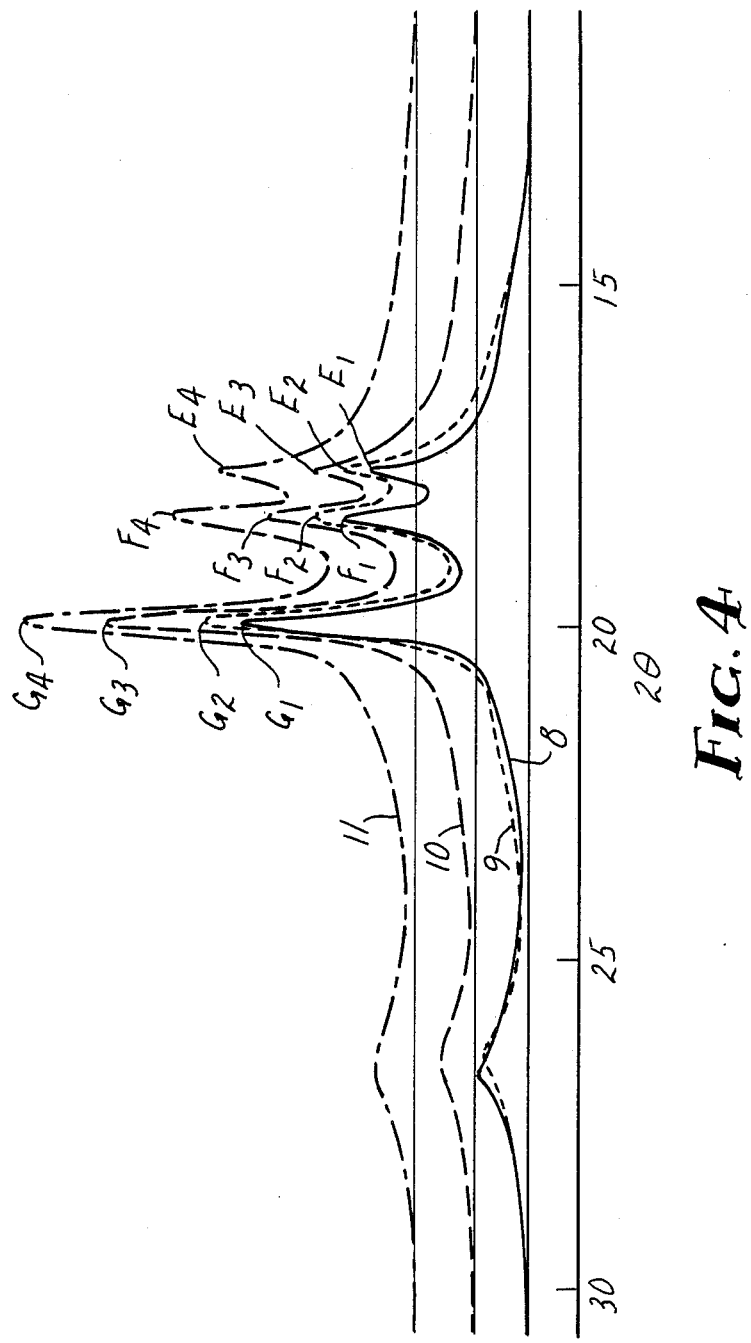
FIG. 4 shows the X-ray diffractometer scans of unirradiated and irradiated PVDF.
Figure 5:
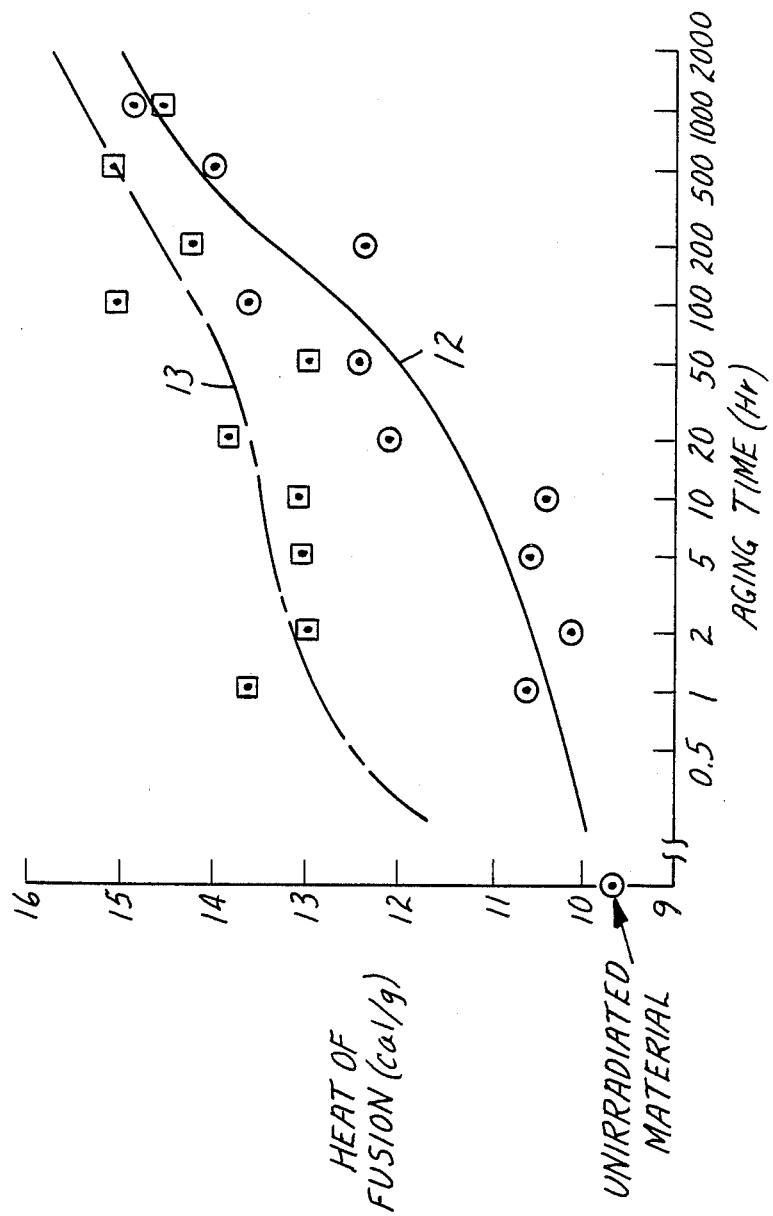
FIG. 5 shows the effect of ambient temperature and pressure aging upon the heat of fusion of high energy irradiated PVDF.

FIG. 4 presents X-ray diffractometer scans of these samples. Curves 8, 9, 10 and 11 respectively represent the X-ray scans of unirradiated, 2 Mrad irradiated, 20 Mrad irradiated, and 50 Mrad irradiated PVDF. These scans indicate that the crystal phase of the unirradiated sample is of the $\alpha$ form and that irradiation has not changed the structure of the crystals to the $\beta$ form. However, irradiation has changed peak heights of the three main reflections: (100, Points $E_1$, $E_2$, $E_3$ and $E_4$), (020, Points $F_1$, $F_2$, $F_3$ and $F_4$), and (110, $G_1$, $G_2$, $G_3$ and $G_4$).

These results show that the crystallinity of the poly(vinylidene fluoride) film has increased significantly as a result of the irradiation.

EXAMPLE 2

The 2 Mrad and 20 Mrad samples of Example 1 were aged at room temperature and pressure. The heat of fusion of each sample was measured at intervals using the procedure described in Example 1. Curves 12 and 13 respectively show the variation of the heat of fusion with aging for the 2 and 20 Mrad samples and show that the heat of fusion of the 2 Mrad sample increased from 10.5 cal/g to 14.9 cal/g (a 42.3% increase) after 1,000 hours aging. The heat of fusion of the 20 Mrad sample increased from 10.4 cal/g to 14.6 cal/g (a 40.4% increase) after 1,000 hours. Conversely, aging the unirradiated sample of polyvinylidene fluoride) film for a similar period of time results in no measureable increase in heat of fusion. Overall, the 2 and 20 Mrad samples exhibit heats of fusion which are respectively 53.6% and 50.5% higher than that of the unirradiated sample.

EXAMPLE 3

The procedure of Example 1 was repeated using radiation doses of 2 and 20 Mrad. After aging for at least 1,000 hours at room temperature and pressure, the films were stretched in the lengthwise direction at 80° C. to 7 to 8 times their original length. After orientation, the heat of fusion for the 2 Mrad exposed sample increased from 14.9 to 18.8 cal/g (a 26.2% increase) while for the 20 Mrad exposed sample, it increased from 14.6 to 16.4 cal/g (a 12.3% increase). When compared to untreated PVDF (heat of fusion of 9.7 cal/g) the two samples respectively show a combined increase in heat of fusion of 93.8% and 69.1%. Infrared measurements of the two samples showed that the 2 Mrad exposed sample comprised 98% β form crystals and 2% α form crystals while the 20 exposed Mrad sample comprised 68% β form crystals and 32% α form crystals. Such increases in the degree of crystallinity, with the crystallites substantially in the β form, will cause a substantial rise in the piezoelectric and pyroelectric activity in poled PVDF film.

I claim:

1. A method for increasing the crystallinity of poly(vinylidene fluoride) polymer comprising the steps of
   (a) providing a film of essentially unoriented poly(vinylidene fluoride) and
   (b) exposing said unoriented film to high energy ionizing radiation at a temperature between the glass transition temperature and the melting temperature of said polymer for a time sufficient to induce an increase in crystallinity of said polymer, said increase occurring without any significant crosslinking.

2. A method according to claim 1 wherein said polymer is exposed to a radiation dose in the range of from 0.5 to 50 megarad.

3. A method according to claim 1 wherein said exposure is carried out for a time sufficient to provide a film having a degree of crystallinity of at least 70%.

4. A method according to claim 1 wherein, subsequent to irradiation, said film is oriented in at least a first direction.

5. A method according to claim 4 wherein said film is oriented in a second direction at a right angle to said first direction.

6. A method according to claim 1 wherein said poly(vinylidene fluoride) comprises the α form of said polymer.

7. A method of enhancing the piezoelectric and pyroelectric coefficient of poly(vinylidene fluoride) film comprising the steps of
   (a) providing an essentially unoriented form of said film;
   (b) irradiating said film with high energy radiation for a time sufficient to induce an increase in crystallinity, in said film, siad irradiation occurring at a temperature between the glass transition temperature and the melting temperature of said film;
   (c) orienting said film in at least a first direction parallel to a first major axis of said film; and
   (d) poling said film.

8. A method according to claim 7 comprising the further step of orienting said film in a second direction at a right angle to said first direction.

9. A method according to claim 7 wherein, prior to irradiation, said film comprises the α crystal form of said poly(vinylidene) fluoride).

10. A method according to claims 1 or 7 wherein said poly(vinylidene fluoride) is a homopolymer of vinylidene fluoride units.

11. A method according to claims 1 or 7 wherein said poly(vinylidene fluoride) comprises a blend of a polymer of vinylidene fluoride units and a compatible polymer.

12. A method according to claims 1 or 7 wherein irradiation is carried out at ambient temperature and pressure.

13. A method according to claim 7 wherein said polymer is exposed to a radiation dose of from 0.5 to 50 megarad.

14. A method for enhancing the crystallinity of essentially unoriented poly(vinylidene fluoride) film comprising the steps of
   (a) exposing said film to high energy ionizing radiation at a temperature between the glass transition temperature and the melting temperature of said polymer; and
   (b) aging said exposed film at room temperature and pressure.

15. A method according to claim 14 comprising the further step of orienting said irradiated aged film.

16. A method according to claim 15 comprising the further step of poling said oriented film.

17. A method according to any one of claim 1, claim 7, or claim 14 wherein siad poly(vinylidene fluoride) is exposed to a radiation dose of from 0.5 to 20 megarad.

* * * * *

UNITED STATES PATENT AND TRADEMARK OFFICE
CERTIFICATE OF CORRECTION

PATENT NO. : 4,808,352
DATED : February 28, 1989
INVENTOR(S) : Shudershan K. Bhateja and Kook D. Pae It is certified that error appears in the above-identified patent and that said Letters Patent is hereby corrected as shown below:

On the title page
Inventorship should include as second inventor -- Kook D. Pae, East Brunswick, NJ--

Col. 1, line 26, "the crystal" should be -- the crystal --.

Col. 6, line 1, "siad" should be -- said --.

Col. 6, line 37, "irradiated aged" should read -- irradiated and aged --.

Col. 6, line 41, "siad" should be -- said --.

Signed and Sealed this

First Day of August, 1989

Attest:

DONALD J. QUIGG

Attesting Officer

Commissioner of Patents and Trademarks